(12) United States Patent
Milione et al.

(10) Patent No.: US 10,345,138 B2
(45) Date of Patent: Jul. 9, 2019

(54) METHOD TO INCREASE THE SIGNAL TO NOISE RATIO OF DISTRIBUTED ACOUSTIC SENSING BY SPATIAL AVERAGING

(71) Applicant: NEC Laboratories America, Inc., Princeton, NJ (US)

(72) Inventors: Giovanni Milione, Franklin Square, NY (US); Philip Nan Ji, Cranbury, NJ (US); Ezra Ip, Plainsboro, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 15/385,972

(22) Filed: Dec. 21, 2016

(65) Prior Publication Data

US 2017/0211970 A1 Jul. 27, 2017

Related U.S. Application Data

(60) Provisional application No. 62/286,035, filed on Jan. 22, 2016.

(51) Int. Cl.
*G01H 9/00* (2006.01)

(52) U.S. Cl.
CPC ................... *G01H 9/004* (2013.01)

(58) Field of Classification Search
CPC ...................................... G01H 9/004
USPC ......................................... 73/627
See application file for complete search history.

(56) References Cited

U.S. PATENT DOCUMENTS

| 2010/0200744 | A1 | 8/2010 | Pearce et al. |
| 2011/0088462 | A1* | 4/2011 | Samson ................ E21B 47/10 |
| | | | 73/152.18 |
| 2012/0183304 | A1* | 7/2012 | Winzer ............. G02B 6/02042 |
| | | | 398/142 |
| 2012/0255362 | A1 | 10/2012 | Den Boer et al. |
| 2013/0068937 | A1* | 3/2013 | Ryf ..................... G02B 6/4206 |
| | | | 250/227.11 |
| 2013/0167628 | A1 | 7/2013 | Hull et al. |
| 2013/0319121 | A1* | 12/2013 | Hill ........................ G01H 9/004 |
| | | | 73/645 |
| 2015/0346370 | A1* | 12/2015 | Martin ............. G01N 29/2418 |
| | | | 73/152.58 |

FOREIGN PATENT DOCUMENTS

GB        2541108        *  2/2017

* cited by examiner

*Primary Examiner* — Jacques M Saint Surin
(74) *Attorney, Agent, or Firm* — Joseph Kolodka

(57) ABSTRACT

A system to perform distributed acoustic sensing (DAS) in an environment with acoustic vibrations present includes at least an optical fiber positioned in said environment, wherein the optical fiber comprises N spatial channels and N laser pulses are launched into the N spatial channels of the optical fiber and propagate over a fiber length; and one or more sensors to measure N signals of acoustic vibration amplitude and frequency from each of N spatial channels, wherein the N signals are digitally added for spatial averaging and applied to determine DAS.

19 Claims, 5 Drawing Sheets

(a) Distributed Acoustic Sensing (DAS)

(b) Optical fiber (c) N optical fibers (d) Multicore optical fiber – N cores

METHOD TO INCREASE THE SIGNAL TO NOISE RATIO OF DISTRIBUTED ACOUSTIC SENSING BY SPATIAL AVERAGING

BACKGROUND

The present invention is related to increasing the signal to noise ratio of distributed acoustic sensing by spatial averaging.

Distributed acoustic sensing (DAS), also referred to as phase or coherent optical time domain reflectometery (OTDR), is the use of an optical fiber to sense acoustic vibrations at any spatial point along the optical fiber's length. As schematically shown in FIGS. 1A-1D, in DAS a laser pulse is launched into the optical fiber and, similar to conventional OTDR, an OTDR "trace" is measured, i.e., Rayleigh backscattered light is measured at every spatial point along the optical fiber's length using a time of flight analysis. FIG. 1A shows a schematic of distributed acoustic sensing (DAS), FIG. 1B shows one optical fiber, FIG. 1C shows N optical fibers, and FIG. 1D shows a multicore optical fiber with N cores. In contrast to conventional OTDR, in DAS the phase of the Rayleigh backscattered light is also measured. If an acoustic vibration makes physical contact with the optical fiber at a spatial point along its length, due to the photoelastic effect, the phase of the Rayleigh backscattered light at that point will be directly proportional to the acoustic vibration's amplitude. By repetitively launching laser pulses into the optical fiber, the acoustic vibration's signal, comprising its amplitude and frequency, can be detected.

As optical fibers can be embedded in various structures, DAS is attractive for applications that require the sensing of acoustic vibrations over long distances with spatial accuracy including, monitoring bridges, tunnels, railroads, buildings, oil wells, borders, among others.

One problem of DAS is increasing the signal to noise ratio (SNR) of the acoustic vibration's detected signal. The noise of DAS has many sources including, laser phase noise, laser intensity noise, amplified spontaneous emission noise originating from the use of optical amplifiers, such as, Erbium doped fiber amplifiers, etc. If SNR is increased, effectively, the length of optical fiber over which an acoustic vibration can be detected will be increased. Additionally, if SNR is increased, at a given optical fiber length, the sensitivity of the detection of an acoustic vibration, i.e., the smallest detectable acoustic vibration, will be increased.

In conventional OTDR, SNR can be increased by temporal averaging—In temporal averaging, laser pulses are repetitively launched into the optical fiber. An OTDR trace is measured for each laser pulse. The OTDR traces are then digitally added. It is assumed that successive OTDR traces are identical—they do not change over time. The noise is assumed to be statistically random while the signal is not. Therefore, by adding successive OTDR traces, noise will add "slower" than the signal, and SNR will increase. However, in contrast to conventional OTDR, in DAS successive OTDR traces are not identical as they correspond to a different phase of the acoustic vibration. As a result, temporally averaging is not possible.

Another solution where SNR can be increased is by increasing the power of the laser pulse that is launched into the optical fiber; more light improves receiver performance. However, there is a limit to how much power can be launched into the optical fiber. Beyond this limit the light will experience nonlinear interactions with the optical fiber that can detrimentally affect the signal of the acoustic vibration. Additionally, beyond a certain power limit certain noise sources, such as, detector shot noise, will increase more than the signal of the acoustic vibration.

Yet another solution is coding. In "coding," similar to temporal averaging, laser pulses are repetitively launched into the optical fiber. An OTDR trace is measured for each laser pulse. However, in coding the light pulses launched into the optical fiber are "coded", i.e., they are launched at discretized time intervals. A unique OTDR trace is measured for each coded laser pulse. The measured OTDR traces are digitally processed to recover the desired OTDR trace. Using coding, the increase of SNR is greater than temporal averaging In coding, it is assumed that for each launched laser pulse, the desired OTDR traces are identical—they do not change over time. However, in contrast to conventional OTDR, in DAS successive OTDR traces are not identical as they correspond to a different phase of the acoustic vibration. As a result, coding is not possible.

Therefore, unlike conventional OTDR, the SNR of DAS cannot be increased by temporal averaging, increasing the power of the launched laser pulse, or with coding. Therefore, here is great need of a method to increase the SNR of DAS. By increasing the SNR of DAS, the length of optical fiber over which an acoustic vibration can be detected will be increased and at a given optical fiber length the sensitivity of the detection of an acoustic vibration, i.e., the smallest detectable acoustic vibration, will be increased.

Others have attempted to increase the SNR of DAS by Raman amplification. In Raman amplification, a laser pulse is launched into an optical fiber and, similar to conventional OTDR, an OTDR "trace" is measured, i.e., Rayleigh backscattered light is measured of at every spatial point along the optical fiber's length using a time of flight analysis. However, the OTDR trace is amplified using Raman amplification, i.e., a Raman pump light beam is also launched into the optical fiber. Raman amplification increases the signal of the acoustic vibration and in turn increases the SNR of DAS.

Unlike conventional OTDR, the SNR of DAS cannot be increased by temporal averaging, increasing the power of the launched laser pulse, or with coding. Therefore, there is great need of a method to increase the SNR of DAS.

SUMMARY

In one aspect, a system to perform distributed acoustic sensing (DAS) in an environment with acoustic vibrations present includes at least an optical fiber positioned in said environment, wherein the optical fiber comprises N spatial channels and N laser pulses are launched into the N spatial channels of the optical fiber and propagate over a fiber length; and one or more sensors to measure N signals of acoustic vibration amplitude and frequency from each of N spatial channels, wherein the N signals are digitally added for spatial averaging and applied to determine DAS.

In another aspect, a system to perform distributed acoustic sensing (DAS) includes: an environment with acoustic vibrations present; at least an optical fiber positioned in said environment, wherein the optical fiber comprises N spatial channels and N laser pulses are launched into the N spatial channels of the optical fiber and propagate over a fiber length; one or more sensors to measure N signals of acoustic vibration amplitude and frequency from each of the N spatial channels from N spatial channels; and a processor to digitally add N signals from the N spatial channels for spatial averaging, wherein a signal to noise ratio (SNR) of the signal of the acoustic vibration is increased by a factor of $N^{1/2}$.

In implementations, the SNR of DAS is increased by spatial averaging. In spatial averaging, DAS is carried out using an optical fiber(s) that has N spatial channels. Using spatial averaging, averaging is possible while maintaining tolerable power levels in the optical fiber. Averaging is possible because multiple signals are acquired via multiple spatial channels at the same time.

In another embodiment of spatial averaging:

1. N laser pulses are launched into N spatial channels of an optical fiber(s) and propagate over its length.
2. An optical fiber(s) that has N spatial channels is used for DAS:
   a. The optical fiber(s) is in proximity to an environment where acoustic vibration(s) must be detected, e.g., bridges, tunnels, railroads, buildings, oil wells, borders, etc. The optical fiber(s) makes direct physical contact with an acoustic vibration(s) or the acoustic vibration(s) is transferred to the optical fiber(s) via an intermediate medium or device at any spatial point along the length of the optical fiber(s).
   b. The N spatial channels can be:
      i. Multiple optical fibers (FIG. 1b). The optical fibers can be single mode or multimode
      ii. Cores of a multicore optical fiber (FIG. 1c). The cores can be single mode or multimode
      iii. Spatial modes of a multimode optical fiber
      iv. Spatial modes of multiple multimode optical fibers
      v. Spatial modes of the cores of a multicore optical fiber
      vi. Spatial modes of the cores of multiple multicore optical fibers
3. Each of the N spatial channels experiences the acoustic vibration(s)
   a. Each spatial channel is assumed to have an identical response to the acoustic vibration(s) and they experience the same phase of the acoustic vibration(s).
   b. Each of the N laser pulses launched into N spatial channels propagating over the length of the optical fiber(s) creates Rayleigh backscattering at every spatial point along the length of the optical fiber(s).
      i. In each of the N spatial channels, the phase of the Rayleigh backscattering at a spatial point along the length of the optical fiber(s) is directly proportional to the amplitude of the acoustic vibration at that spatial point.
4. N signals of the acoustic vibration(s) amplitude and frequency are measured from each of the N spatial channels of the optical fiber(s). The N signals are measured via the phase of the Rayleigh backscattering and OTDR traces
5. The N measured signals of the acoustic vibration(s) amplitude and frequency are digitally added producing a new signal of the acoustic vibration(s) amplitude and frequency.
   a. The SNR of the new signal of the acoustic vibration's amplitude and frequency is increased by a factor of $N^{1/2}$ Advantages of the system may include one or more of the following. The SNR of DAS is increased without temporal averaging, without increasing the power of the launched laser pulse, and without coding. By increasing the SNR of DAS, the length of optical fiber over which an acoustic vibration can be detected will be increased. Additionally, if the SNR is increased, at a given optical fiber length, the sensitivity of the detection of an acoustic vibration, i.e., the smallest detectable acoustic vibration, will be increased. The SNR of DAS is increased without temporal averaging, without increasing the power of the launched laser pulse, and without coding. In the present invention, the SNR of DAS is increased by a method referred to as spatial averaging. Because it is not possible to increase the SNR of DAS using conventional methods, using spatial averaging the SNR can be increased. By using spatial averaging to increase the SNR of DAS, the length of optical fiber over which an acoustic vibration can be detected will be increased. Additionally, if the SNR is increased, at a given optical fiber length, the sensitivity of the detection of an acoustic vibration, i.e., the smallest detectable acoustic vibration, will be increased. Additionally, spatial averaging can be used with other methods to increase the SNR of DAS, such as, Raman amplification. This will provide a further increase in the length of optical fiber over which an acoustic vibration can be detected will be increased, and an increase, the sensitivity of the detection of an acoustic vibration at a given optical fiber length.

DESCRIPTION

Figure 2:
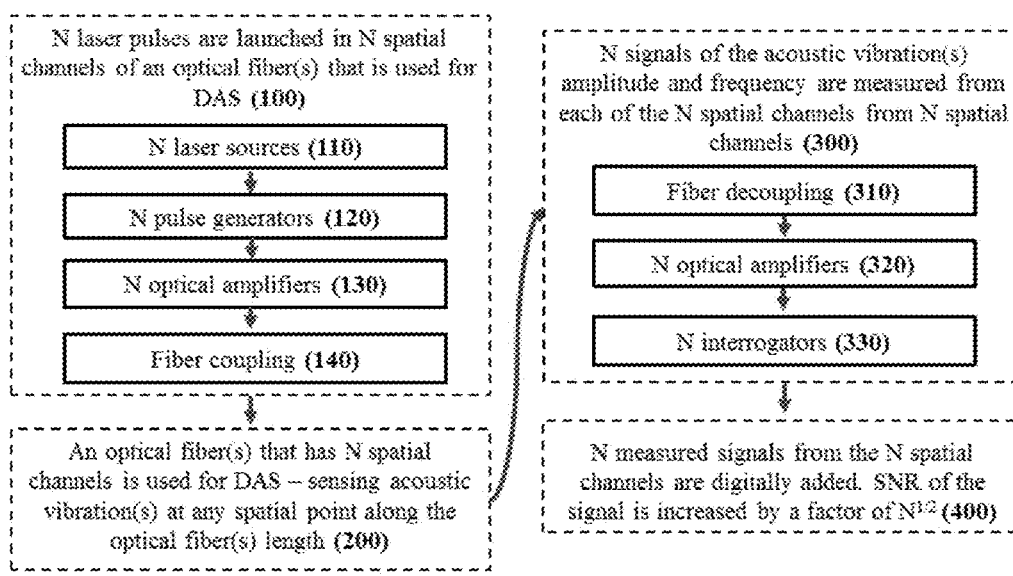
FIG. 2 shows an exemplary process to perform spatial averaging.

FIG. 2 shows an exemplary process to perform spatial averaging. The process includes the following operation:

In (100) N laser pulses are launched into N spatial channels of an optical fiber(s) and propagate over its length.

In (110) N lasers sources are used to generate coherent and continuous wave laser light that will be launched into N "spatial channels" of an optical fiber(s) that is used for DAS (200). <N laser source can also be used and divided N times and then launched into the N spatial channels. Laser sources include solid state lasers, gas lasers, optical fiber lasers, etc. The wavelength of the laser sources can be any wavelength that is guided in an optical fiber, e.g., visible, near-infrared, etc.

In (120) N pulse generators are used to convert the continuous wave laser light from the N laser sources (110) into N laser pulses, i.e., the continuous wave laser light is temporally modulated. The pulse width and the repetition rate of the pulses are controlled by the pulse generator such that they meet the spatial resolution and optical fiber length requirements of DAS. <N pulse generators can also be used to modulate the continuous wave laser light from the N laser sources (110). A pulse generator can be an acoustic optic modulator, a semiconductor optical amplifier, a Mach-Zender modulator, etc. The N pulse generators convert the N laser sources into N laser pulses with identical pulse widths and repetition rates.

In (130) N optical amplifiers are used to amplify the N laser pulses. The amplifier can be an erbium doped fiber amplifier, a semiconductor optical amplifier, Raman amplification, etc. A single optical amplifier can be also used to amplify the N laser pulses.

In (140) Fiber coupling—The N laser pulses are coupled into the N spatial channels of an optical fiber(s) that is used for DAS (200). The N laser pulses are coupled into the N spatial channels using free space optics (e.g. lenses, mirrors), liquid crystal on silicon spatial light modulators, digital micro-mirror devices utilizing a micro-electro-mechanical systems, and optical fiber couplers, such as, "fan-out" devices, photonic lanterns, etc. The N laser pulses are coupled in the N spatial channels at identical times.

Figure 3:
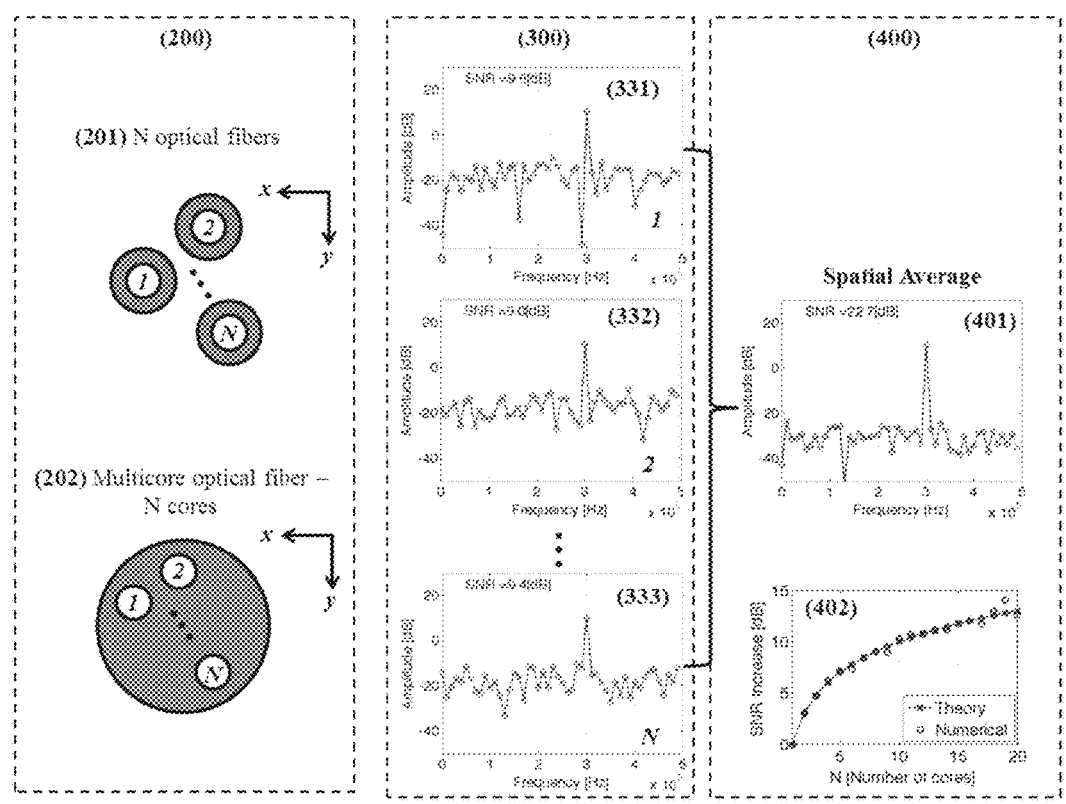
FIG. 3 shows an exemplary schematic of spatial averaging operation.
Figure 4:
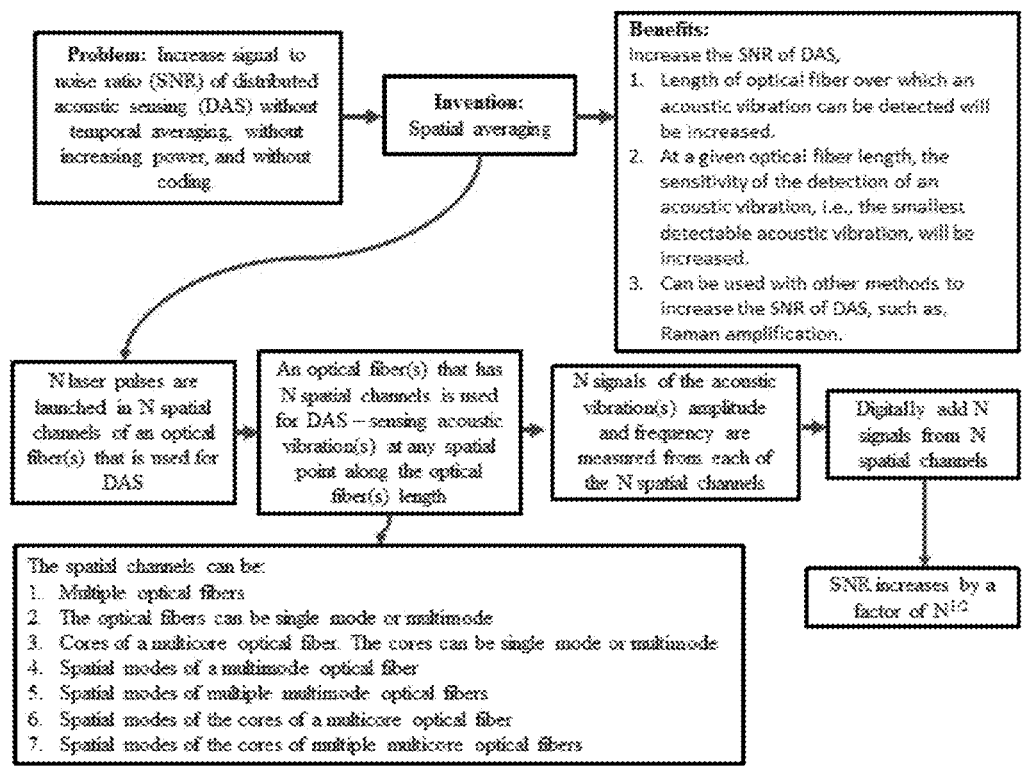
FIG. 4 shows another exemplary spatial averaging DAS system.

In (200) Optical fiber(s) that has N spatial channels is used for DAS that—
1. The optical fiber(s) is in proximity to an environment where acoustic vibration(s) must be detected, e.g., bridges, tunnels, railroads, buildings, oil wells, borders, etc. The optical fiber(s) makes direct physical contact with an acoustic vibration(s) or the acoustic vibration(s) is transferred to the optical fiber(s) via an intermediate medium or device at any spatial point along the length of the optical fiber(s).
2. The N spatial channels of the optical fiber that is used for DAS. Each spatial channel is discriminated by space, i.e., they are orthogonal with respect to each other. This includes can be:
   a. (201) Multiple optical fibers (FIG. 3). The optical fibers can be single mode or multimode
   b. (202) Cores of a multicore optical fiber (FIG. 3). The cores can be single mode or multimode
   c. Spatial modes of a multimode optical fiber
   d. Spatial modes of multiple multimode optical fibers
   e. Spatial modes of the cores of a multicore optical fiber
   f. Spatial modes of the cores of multiple multicore optical fibers
3. Each of the N spatial channels experiences the acoustic vibration(s)
   a. Each spatial channel is assumed to have an identical response to the acoustic vibration(s) and they experience the same phase of the acoustic vibration(s).
   b. Each of the N laser pulses launched into N spatial channels propagating over the length of the optical fiber(s) creates Rayleigh backscattering at every spatial point along the length of the optical fiber(s).
      i. In each of the N spatial channels, the phase of the Rayleigh backscattering at a spatial point along the length of the optical fiber(s) is directly proportional to the amplitude of the acoustic vibration at that spatial point In (300) N signals of the acoustic vibration(s) amplitude and frequency are measured from each of the N spatial channels from N spatial channels In (310) Fiber decoupling—The Rayleigh backscattered light is decoupled from the N spatial channels of the optical fiber(s) used for DAS (200). The Rayleigh backscattered light is decoupled from each of the N spatial channels using free space optics (e.g. lenses, mirrors), liquid crystal on silicon spatial light modulators, digital micro-mirror devices utilizing a micro-electro-mechanical systems, and optical fiber couplers, such as, "fan-out" devices, photonic lanterns, etc. The Rayleigh backscattered light is decoupled from the N spatial channels at identical times.

In (320) N optical amplifiers are used to amplify the Rayleigh backscattered light from the N spatial channels of the optical fiber(s) used for DAS. The amplifiers can be an erbium doped fiber amplifiers, semiconductor optical amplifiers, Raman amplification, etc. A single optical amplifier can be also used.

In (330) N Interrogators are used where N signals of the acoustic vibration(s) amplitude and frequency are measured from the Rayleigh backscattering from each of the N spatial channels of the optical fiber(s) using N "interrogators".

An interrogator includes:
1. A method to measure the phase of the Rayleigh backscattering, such as, an interferometer. The interferometer can be self-referenced, use a local oscillator, heterodyne, homodyne, a Mach-Zender interferometer, a Michelson interferometer, etc.
2. Photodetectors to convert the Rayleigh backscattering to an electrical signal.
3. Any method to measure OTDR traces of the Rayleigh backscattering, such as a time of flight measurement using, for example, a real-time oscilloscope,
4. A digital memory to store the OTDR traces.
5. A method of digital signal processing to convert the measured OTDR traces to the signal of the acoustic vibration—Signal 1 (331), Signal 2 (332), . . . , Signal N (333)

(400) Digitally add N signals—The N measured signals (330) of the acoustic vibration(s) amplitude and frequency are digitally added producing a new signal of the acoustic vibration(s) amplitude and frequency referred to as the spatial average (401)

$$\text{Spatial Average} = \text{Signal1} + \text{Signal2} + \ldots + \text{Signal} N \tag{1}$$

Each of the N signals will have additional noise. The noise has many sources including, laser phase noise, laser intensity noise, amplified spontaneous emission noise originating from optical amplifiers, such as, Erbium doped fiber amplifiers, etc. Noise is considered to be statistically random. When digitally adding the N signals, noise adds "slower" than the signals, and the resulting SNR of the spatial average as a function of N is given by:

$$SNR(N) \sim N^{1/2} \tag{2}$$

Using N spatial channels for spatial averaging, the SNR of the signal of the acoustic vibration will increase by a factor of N1/2. FIG. 3 (402) shows a plot of the theoretically calculated and numerically calculated SNR as a function of N when digitally averaging the N signals (Eq. 1).

The system solves the need for increasing the signal to noise ratio (SNR) of the acoustic vibration's detected signal. In contrast to conventional OTDR, SNR of DAS cannot be increased by:
1. Temporal Averaging because in DAS successive OTDR traces are not identical as they correspond to a different phase of the acoustic vibration.
2. Increasing Power because there is a limit to how much power can be launched into the optical fiber. Beyond this limit the light will experience nonlinear interactions with the optical fiber that can detrimentally affect the signal of the acoustic vibration. Additionally, beyond a certain power limit certain noise sources, such as, detector shot noise, will increase more than the signal of the acoustic vibration.
3. Coding because in DAS successive OTDR traces are not identical as they correspond to a different phase of the acoustic vibration.

The spatial averaging of the present system allows the SNR of DAS to be increased without temporal averaging, without increasing power, and without coding. Using spatial averaging, averaging is possible while maintaining tolerable power levels in the optical fiber. Averaging is possible because multiple signals are acquired via multiple spatial channels at the same times. In contrast to conventional methods of DAS, in spatial averaging multiple spatial channels are used.

An optical fiber with N spatial channels is used for DAS and N laser pulses are launched into N spatial channels of an optical fiber(s) and propagate over its length. N signals of the acoustic vibration(s) amplitude and frequency are measured from each of the N spatial channels from N spatial channels, and the system digitally adds N signals—Using N spatial channels for spatial averaging, the SNR of the signal of the acoustic vibration will increase by a factor of $N^{1/2}$.

Figure 1:
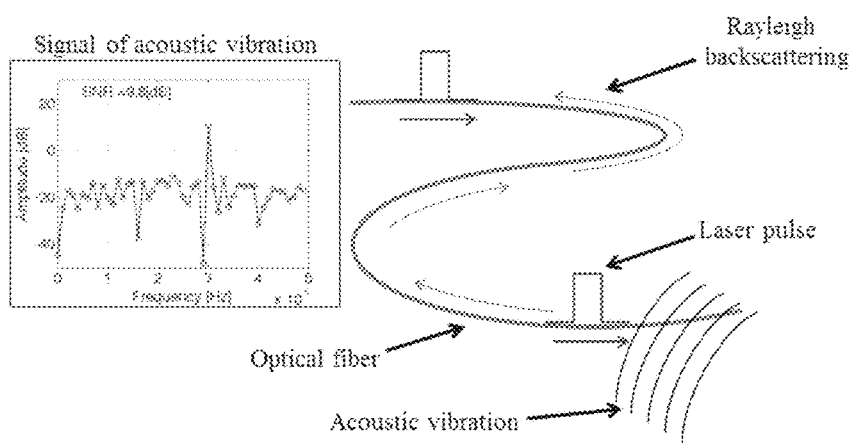
FIG. 1 shows various approaches to DAS determination.
Figure 1:
Figure 1:
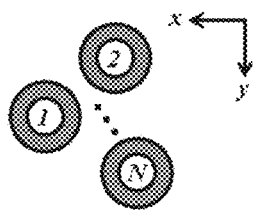
Figure 1:
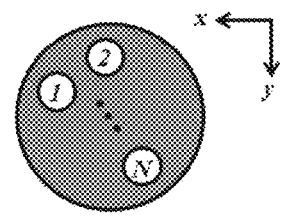
Figure 5:
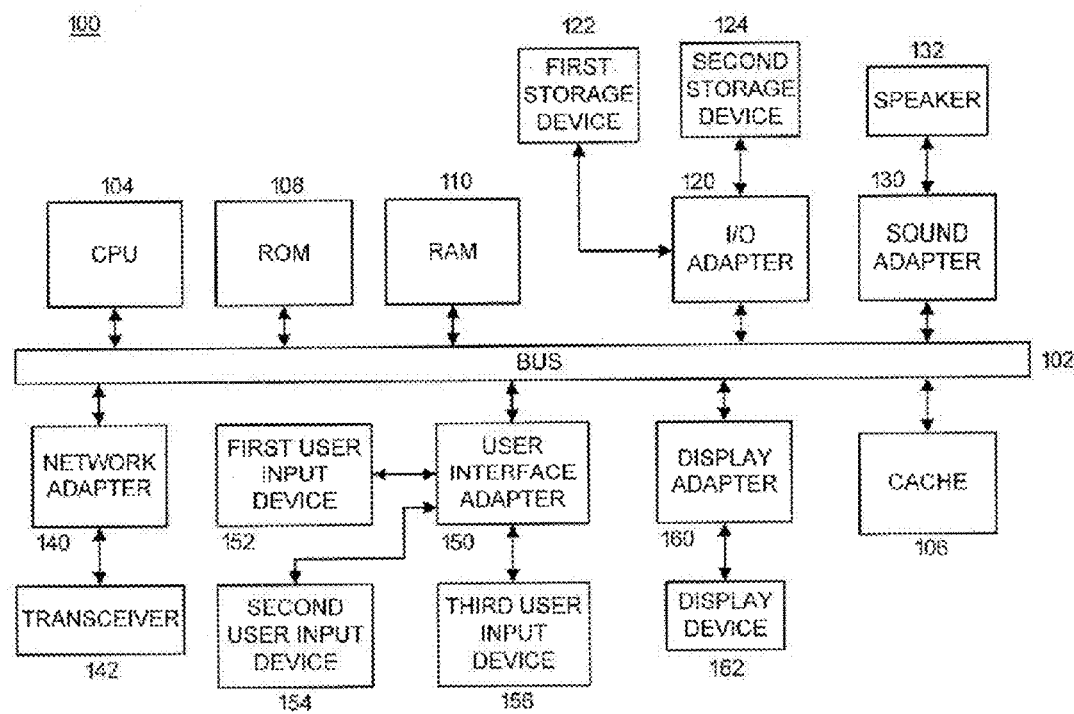
FIG. 5 shows an exemplary processor to handle spatial averaging.

In the present invention, the SNR of DAS is increased by a method referred to as spatial averaging. In spatial averaging, DAS is carried out using an optical fiber(s) that has N spatial channels. Using spatial averaging, averaging is possible while maintaining tolerable power levels in the optical fiber. Averaging is possible because multiple signals are acquired via multiple spatial channels at the same time. In spatial averaging, a method can include the following:

1. N laser pulses are launched into N spatial channels of an optical fiber(s) and propagate over its length.
2. An optical fiber(s) that has N spatial channels is used for DAS:
    a. The optical fiber(s) is in proximity to an environment where acoustic vibration(s) must be detected, e.g., bridges, tunnels, railroads, buildings, oil wells, borders, etc. The optical fiber(s) makes direct physical contact with an acoustic vibration(s) or the acoustic vibration(s) is transferred to the optical fiber(s) via an intermediate medium or device at any spatial point along the length of the optical fiber(s).
    b. The N spatial channels can be:
        i. Multiple optical fibers (FIG. 1b). The optical fibers can be single mode or multimode
        ii. Cores of a multicore optical fiber (FIG. 1c). The cores can be single mode or multimode
        iii. Spatial modes of a multimode optical fiber
        iv. Spatial modes of multiple multimode optical fibers
        v. Spatial modes of the cores of a multicore optical fiber
        vi. Spatial modes of the cores of multiple multicore optical fibers
3. Each of the N spatial channels experiences the acoustic vibration(s)
    a. Each spatial channel is assumed to have an identical response to the acoustic vibration(s) and they experience the same phase of the acoustic vibration(s).
    b. Each of the N laser pulses launched into N spatial channels propagating over the length of the optical fiber(s) creates Rayleigh backscattering at every spatial point along the length of the optical fiber(s).
        i. In each of the N spatial channels, the phase of the Rayleigh backscattering at a spatial point along the length of the optical fiber(s) is directly proportional to the amplitude of the acoustic vibration at that spatial point.
4. N signals of the acoustic vibration(s) amplitude and frequency are measured from each of the N spatial channels of the optical fiber(s). The N signals are measured via the phase of the Rayleigh backscattering and OTDR traces
5. The N measured signals of the acoustic vibration(s) amplitude and frequency are digitally added producing a new signal of the acoustic vibration(s) amplitude and frequency.
    a. The SNR of the new signal of the acoustic vibration's amplitude and frequency is increased by a factor of $N^{1/2}$ Referring to the drawings in which like numerals represent the same or similar elements and initially to FIG. 5, a block diagram describing an exemplary processing system 100 to which the present principles may be applied is shown, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to a system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to the system bus 102 by the sound adapter 130. A transceiver 142 is operatively coupled to the system bus 102 by a network adapter 140. A display device 162 is operatively coupled to the system bus 102 by a display adapter 160. A first user input device 152, a second user input device 154, and a third user input device 156 are operatively coupled to the system bus 102 by a user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used while maintaining the spirit of the present principles. The user input devices 152, 154, and 156 can be the same type of user input device or different types of user input devices. The user input devices 152, 154, and 156 are used to input and output information to and from the system 100.

Of course, the processing system 100 may also include other elements (not shown), as readily contemplated by one of skill in the art, as well as omit certain elements. For example, various other input devices and/or output devices can be included in the processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations, can also be utilized as readily appreciated by one of ordinary skill in the art. These and other variations of the processing system 100 are readily contemplated by one of ordinary skill in the art given the teachings of the present principles provided herein.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. An apparatus for performing distributed acoustic sensing (DAS) in an environment with acoustic vibrations present, comprising:
   at least an optical fiber positioned in said environment, wherein the optical fiber comprises N spatial channels and N laser pulses are launched into the N spatial channels of the optical fiber and propagate over a fiber length; and
   one or more sensors to measure N signals of acoustic vibration amplitude and frequency from each of N spatial channels, wherein the N signals are digitally added for spatial averaging and applied to determine DAS,
   wherein N measured signals of the acoustic vibration(s) amplitude and frequency are digitally added producing a new signal of the acoustic vibration(s) amplitude and frequency,
   wherein the SNR of the new signal of the acoustic vibration's amplitude and frequency is increased by a factor of $N^{1/2}$.

2. The apparatus of claim 1, comprising a processor to digitally add the N signals from the N spatial channels for spatial averaging, wherein a signal to noise ratio (SNR) of the signal of the acoustic vibration is increased by a factor of $N^{1/2}$.

3. The apparatus of claim 1, wherein the optical fiber is acoustically coupled to vibrations.

4. The apparatus of claim 1, wherein the environment comprises one of: bridges, tunnels, railroads, buildings, oil wells, borders.

5. The apparatus of claim 1, wherein the spatial channels comprises multiple optical fibers.

6. The apparatus of claim 1, wherein the spatial channels comprises a single mode or a multi-mode fiber.

7. The apparatus of claim 1, wherein the spatial channels comprise cores of a multicore optical fiber and wherein each core comprises a single mode or a multi-mode fiber.

8. The apparatus of claim 1, wherein the spatial channels comprises spatial modes of one or more multimode optical fibers.

9. The apparatus of claim 1, wherein the spatial channels comprises spatial modes of cores of a multicore optical fiber.

10. The apparatus of claim 1, wherein the spatial channels comprises spatial modes of cores of multiple multicore optical fiber.

11. The apparatus of claim 1, wherein each N spatial channel experiences acoustic vibrations.

12. The apparatus of claim 1, wherein each spatial channel has an identical response to the acoustic vibration(s) and experiences the same phase of the acoustic vibration(s).

13. The apparatus of claim 1, wherein each of the N laser pulses launched into the N spatial channels propagating over a length of the optical fiber(s) and creates Rayleigh backscattering at one or more spatial points along the length of the optical fiber(s).

14. The apparatus of claim 13, wherein for each of the N spatial channels, a phase of a Rayleigh backscattering at a spatial point along the length of the optical fiber(s) is proportional to the amplitude of the acoustic vibration at that spatial point.

15. The apparatus of claim 1, wherein N signals of the acoustic vibration(s) amplitude and frequency are measured from each of the N spatial channels of the optical fiber(s).

16. The apparatus of claim 1, wherein N signals are measured using a phase of the Rayleigh backscattering and optical time domain reflectometry (OTDR) traces.

17. The apparatus of claim 1, wherein N signals of the acoustic vibration(s) amplitude and frequency are measured from the Rayleigh backscattering from each of the N spatial channels of the optical fiber(s) using N interrogators.

18. The apparatus of claim 17, comprising an interferometer to measure a phase of Raleigh backscattering.

19. The apparatus of claim 18, wherein the interferometer comprises one of: a self-referenced unit, a local oscillator, a heterodyne oscillator, a homodyne oscillator, a Mach-Zender interferometer, a Michelson interferometer.

* * * * *